(12) United States Patent
Shiell (10) Patent No.: US 6,408,320 B1
(45) Date of Patent: Jun. 18, 2002

(54) INSTRUCTION SET ARCHITECTURE WITH VERSATILE ADDER CARRY CONTROL

(75) Inventor: Jonathan H. Shiell, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/238,236

(22) Filed: Jan. 27, 1999

Related U.S. Application Data (60) Provisional application No. 60/072,687, filed on Jan. 27, 1998.

(51) Int. Cl.[7] ............................... G06F 7/38; G06F 7/50
(52) U.S. Cl. ...................... 708/518; 708/706; 708/714
(58) Field of Search ................................. 708/518, 670, 708/700, 706, 707, 710, 711, 712, 713, 714

(56) References Cited

U.S. PATENT DOCUMENTS

| | | | |
|---|---|---|---|
| 4,707,800 A | * 11/1987 | Montrone et al. | ........... 708/714 |
| 5,883,824 A | * 3/1999 | Lee et al. | ................... 708/445 |
| 5,959,874 A | * 9/1999 | Lin et al. | .................... 708/700 |

* cited by examiner

*Primary Examiner*—Chuong Dinh Ngo
(74) *Attorney, Agent, or Firm*—Robert D. Marshall, Jr.; W. James Brady, III; Frederick J. Telecky, Jr.

(57) ABSTRACT

A data processing circuit has an adder unit divided into plural sections. Each section receives a subset of the bits of the operands and generates a subset of the bits of the resultant. A carry multiplexer is disposed between the sections. This carry multiplexer selects one of a plurality of possible carry inputs to the following sections. The data processing circuit may make the specification of the selection of the carry control multiplexers by: the opcode of the instruction; a combination of the opcode and an opcode modification field; an immediate field directly specifying carry control signals; or designation a carry control register which stores the carry control signals. The adder unit may be divided into sections of equal size or of unequal size.

21 Claims, 5 Drawing Sheets

| OPCODE | SOURCE 1 | SOURCE 2 | DEST | OPCODE MODS |
|---|---|---|---|---|

FIG. 2b

| OPCODE | SOURCE 1 | SOURCE 2 | DEST | CARRY CONTROL FIELD |
|---|---|---|---|---|

FIG. 2c

| OPCODE | SOURCE 1 | SOURCE 2 | DEST | CARRY CONTROL FIELD REGISTER |
|---|---|---|---|---|

INSTRUCTION SET ARCHITECTURE WITH VERSATILE ADDER CARRY CONTROL

This application claims priority under 35 USC §119(e)(1) of Provisional Application No. 60/072,687, filed Jan. 27, 1998.

TECHNICAL FIELD OF THE INVENTION

The technical field of this invention is microprocessors and digital signal processors, especially those used for video and audio processing using diverse data sizes.

BACKGROUND OF THE INVENTION

The adder units of data processors are becoming larger and larger. Most high performance data processors operation on data words of 32 bits but data words of 64 bits are also known in the art. Such wide adder units provide increased parallelism and greater processing speed only if the real data manipulated is of this large width. Using a 64 bit wide adder unit to operate on 8 bit data is no better than using a 32 bit wide adder unit. It is known in the art to employ single instruction multiple data operations (SIMD) using these wide adder units. The adder unit is divided into a number of sections with the carry propagation between sections interrupted. This enables the wide adder unit to perform the same operation on data elements smaller in size packed into the wide data word. This processing takes advantage of the parallelism provided by wide adder units.

There remain some problems with these SIMD techniques. There is currently no easy way to deal with data overflow beyond the separate sections of the divided adder unit. Typical algorithms may require many additions or subtractions on the packed data with no guarantee that the result won't overflow or underflow. Currently checking for and recovery from overflow and underflow is handled inefficiently in software. Additionally, there is no current technique for SIMD operations on packed data of mixed size.

SUMMARY OF THE INVENTION

This invention is a data processing circuit having an adder unit divided into plural sections. Each section, receives a subset of the bits of the operands and generates a subset of the bits of the resultant. A carry multiplexer is disposed between the sections. This carry multiplexer selects one of a plurality of possible carry inputs to the following sections. In a first embodiment, the selection made by the carry input multiplexers is between: a fixed "0"; a fixed "1"; the carry output of the prior section: or the stored carry output of the same section from a prior operation. Selection from among these carry inputs would enable the adder unit to manipulate packed data in a variety of sizes, even mixed sizes within the same operation.

The data processing circuit may make the specification of the selection of the carry control multiplexers a number of ways. Firstly, the opcode of the instruction may be decoded to specify the carry multiplexer selections. Secondly, a combination of the opcode of the instruction and an opcode modification field may be decoded to specify the carry multiplexer selections. An immediate field of the instruction may directly specify the carry control signals controlling the selection of the carry multiplexers. The instruction could designate one of a plurality of carry control registers which store the carry control signals.

The carry multiplexers may also receive the stored carry outputs of each of the other sections. Proper selection of the stored carry outputs would permit extended precision arithmetic on packed data of a variety of sizes and upon packed data of mixes sizes within the same operation.

In a first the preferred embodiment, the adder unit consists of an arithmetic logic unit divided into sections of equal size. Convenient size selections include 32 total bits divided into 4 sections of 8 bits each and 64 total bits divided into 4 sections of 16 bits each. Alternatively, the arithmetic logic unit may be divided into sections of unequal length. A convenient size selection includes 64 total bits divided into 6 sections of 8 bits each and 4 sections of 4 bits each. The nibble (4 bit) sections are preferably disposed contiguously at either the least significant bits or the most significant bits.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
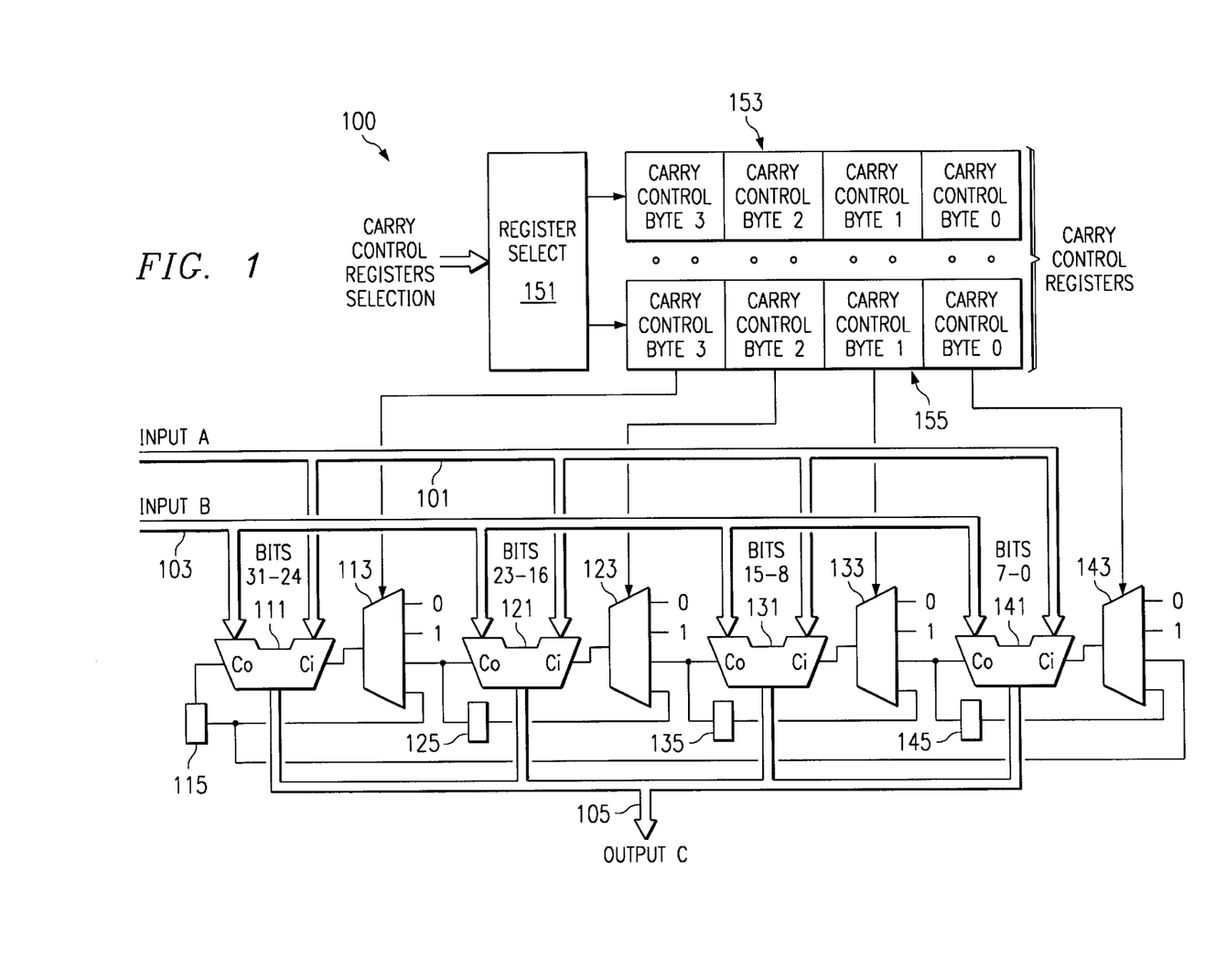
FIG. 1 illustrates in schematic diagram form an exemplary embodiment of the arithmetic logic unit carry control of this invention.

FIG. 1 illustrates an example of an adder unit 100 with the versatile carry control of this invention. In the preferred embodiment adder unit 100 is formed as an integral part of an arithmetic logic unit. This will be further detailed below. In the example illustrated in FIG. 1, adder unit 100 operates on 32 bits in parallel. These are designated bits 31 to 0. Adder unit 100 receives two 32 bit inputs, input A on input bus 101 and input B on input bus 103. Adder unit 100 produces a single 32 bit output C on output bus 105. Adder unit 100 is divided into four 8 bit sections 111, 121, 131 and 141, designated bytes 3, 2, 1 and 0 respectively. Section 111 receives input bits 31 to 24 from respective input busses 101 and 103 and produces output bits 31 to 24 on output bus 105. Section 121 input bits 23 to 16 from respective input busses 101 and 103 and produces output bits 23 to 16 on output bus 105. Section 131 input bits 15 to 8 from respective input busses 101 and 103 and produces output bits 15 to 5 on output bus 105. Lastly, section 141 input bits 7 to 0 from respective input busses 101 and 103 and produces output bits 7 to 0 on output bus 105. Those skilled in the art would recognize that this total bit width (32 bits) and this number of sections (4 sections) are exemplary only and that other widths and numbers of sections are feasible. In particular, a 64 bit adder unit divided into 4 sections of 16 bits represents another desirable combination.

Each of the sections 111, 121, 131 and 141 have a corresponding carry inputs Ci and carry outputs Co. These. carry inputs Ci and carry outputs Co for each section are the ordinary carries known in the art. Each of the sections 111, 121, 131 and 141 has a corresponding carry input multiplexer 113, 123, 133 or 143. The carry input multiplexers 113, 123, 133 and 143 select between four inputs. These are: a fixed input of 0; a fixed input of 1; the carry output of the prior section, with the stored previous operation carry output of byte 3 section 111 wrapped around to byte 0 section 143; and the carry output of immediately prior operation of the corresponding section stored in respective carry output registers 115, 125, 135 and 145.

The carry input selection of each of the carry input multiplexers 113, 123, 133 and 143 are controlled by a carry control signal. In the exemplary embodiment of FIG. 1, the carry control signals for carry input multiplexers 113, 123, 133 and 143 come from respective byte sections of a selected carry control register. A carry control register selection signal is supplied to register select 151. Register select 151 decodes this carry control register selection signal and then selects one of a plurality of carry control registers. In FIG. 1 the illustrated carry control registers 153 and 155 represent a plurality of registers. The number employed in any particular embodiment is a design choice. Each of the carry control registers 153 to 155 has four carry control fields, one for each byte 3, 2, 1 and 0. In this exemplary embodiment each carry control field has two bits. Table 1 shows an exemplary coding of these carry control fields.

TABLE 1

| Carry Control Field Coding | Carry Input Selection |
| --- | --- |
| 0 0 | 0 |
| 0 1 | 1 |
| 1 0 | Prior Section Carry Out (PSCO) |
| 1 1 | Same Section Prior Carry Out (SSPCO) |

This application will demonstrate how this carry input control system permits a variety of useful functions.

Figure 2A:
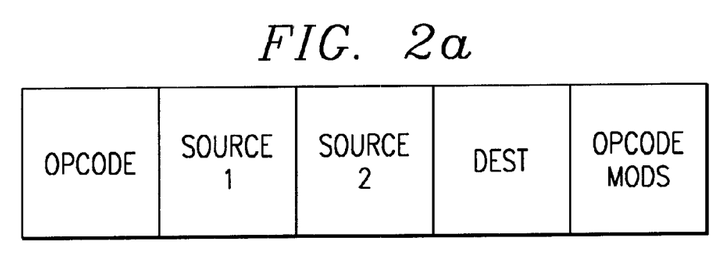
FIGS. 2a, 2b and 2c illustrate examples of three types of instruction coding used with the example arithmetic logic unit illustrated in FIG. 1.

FIGS. 2a, 2b and 2c illustrate three examples of instruction format the can support and control the versatile carry input control illustrated in FIG. 1. The instruction set of a particular microprocessor or digital signal processor embodying this invention may include one, two or all three of these instruction types. In FIG. 2a, the instruction has four required fields and one optional field. The first required field is the Opcode field. The Opcode field selects the operation of adder unit 100 in a manner known in the art. In the preferred embodiment, adder unit 100 is formed an integral part of an arithmetic logic unit. Such an arithmetic logic unit is typically capable of the arithmetic functions of addition and subtraction, various logic operations (AND, OR, NOT, XOR and the like) and control functions such as branches subroutine calls and returns and the like. In the preferred embodiment, the Opcode field of the instruction is capable of specifying any of the enabled operations. The next required fields are the Source 1 and Source 2 fields. The Source 1 and Source 2 fields designate the register sources for the inputs A and B as known in the art. The Destination field designates the register destination for the output C in the same manner as known in the art. The optional Opcode Modification field serves to modify or extend the adder unit operation designated by the Opcode field. When using this instruction format, either the Opcode field alone or the Opcode field as modified by the Opcode Modification field selects the carry control signals supplied to the plural carry input multiplexers. In this instance certain frequently used combinations of carry control signals are coded into the Opcode field. Alternatively, the Opcode Modification field modifies the operation selected by the Opcode field to designate a. particular combination of carry control signals from a. predetermined set of such combinations. As a further alternative, a particular combination of bits in the Opcode field may specify addition or subtraction with the carry control signals recalled from a predetermined writable control register. When using this instruction format, carry control registers 153 to 155 represent fixed combinations of the byte control fields which may be selected by the Opcode field or the Opcode field as modified by the Opcode Modification field or the byte control fields may be within a writable control register corresponding to the decoded Opcode fields. This instruction format of FIG. 2a is useful in cases where it is not necessary to permit selection of all possible combinations of carry control signals. The alternative employing a predetermined control register to specify the carry control signals is useful for cases in which it is not necessary to switch between plural sets of carry control signals.

Figure 2B:
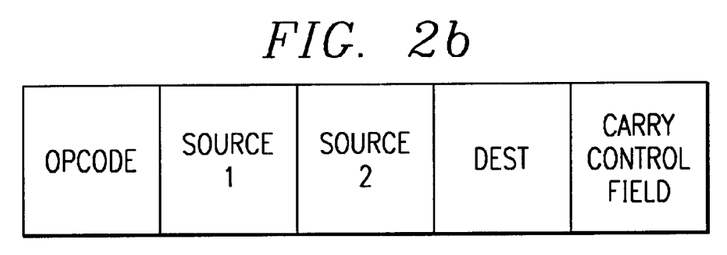

The instruction format in FIG. 2b permits specification of all possible combinations of carry input multiplexer, selections. The instruction format of FIG. 2b includes the Opcode field, Source 1 field, Source 2 field and Destination field in the same manner as in the instruction format of FIG. 2a. The instruction format of FIG. 2b includes an immediate field designated the carry control field. This carry control field includes carry control fields for each of the bytes 3, 2, 1 and 0. Thus in this instruction format the. instruction directly specifies the carry input selected by each carry input selection multiplexer. In the exemplary embodiment of FIG. 1 the instruction would require 8 bits to designate the carry input selected by the four carry input selection multiplexers 113, 123, 133 and 143. When using this instruction format, the selected carry control register 153 to 155 represents the instruction register. This instruction format of FIG. 2b is useful for cases in which it is desirable to permit for the instruction to specify of all possible combinations of carry input multiplexer selections.

Figure 2C:
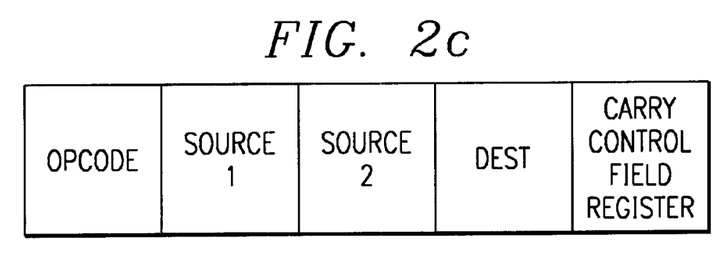

The instruction format in FIG. 2c permits selection of one of a plurality of preselected combinations of carry input multiplexer selections. The instruction format of FIG. 2c includes the Opcode field, Source 1 field, Source 2 field and Destination field in the same manner as in the instruction format of FIG. 2a. The instruction format of FIG. 2c includes another register designation field called the carry control field. register field. This field becomes the carry control register selection signal supplied to the register select unit 151. Register select unit 151 decodes this carry control register selection signal and selects one of the plurality of carry control registers 153 to 155. This instruction format of FIG. 2c is useful when preselection of a limited number of combinations of carry register control inputs is valuable. The desired combinations are formed and then preloaded into the carry control registers. Any of these combinations can then be selected via the carry control field register field of the instruction. This permits all possible combinations of carry control fields to be specified, but requires some overhead to write combinations not already stored within the one of the carry control field registers. The instruction format of FIG. 2c may be used in preference to the instruction format of FIG. 2b when the number of bits required to specify the carry input control combinations is greater than the available immediate bits. This may occur for embodiments having more adder unit sections than illustrated in FIG. 1 or for instruction words shorter than 32 bits. In addition, the instruction format of FIG. 2c will typically require fewer instruction bits to specify the control register than needed to completely specify all the carry control signals. Thus the instruction format of FIG. 2c will preserve instruction bits relative to the instruction format of FIG. 2b. This feature may be useful in cases where the instructions are used to specify many possible operations.

The example instruction formats illustrated in FIGS. 2a, 2b and 2c do not represent all possible instruction formats for practicing this invention but merely illustrative examples. It is known in the art to provide instructions in which one of the designated source registers is always implied as the destination register. These instructions are known as "destructive" instructions because the data within one source register is overwritten with the results of the instruction. In such destructive instruction formats the instruction includes only the two source register fields and the destination register field is omitted. Another possible instruction format is used in stack oriented architectures. In these instructions the top of the stack is one implied operand and the resultant data is written to the top of the stack. In such stack instruction formats only a single source register field is required. Those skilled in the art would readily appreciate that this invention can be easily implemented in these alternative instruction formats as well as others.

Table 2 illustrates the carry control field combinations for a number of useful operations for adder unit 100 illustrated in FIG. 1. Note that Table 2 does not list all of the 256 possible combinations. Some of these combinations may not be immediately useful. Note that generally, while Table 2 lists addition operations, it is known in the art that corresponding subtraction operations can be performed with the same carry control coding by changing the function input into adder unit 100 and changing any initial carry inputs from 0 to 1. This carry control technique is useful for any arithmetic operation involving carries. For ease of reference, any of these operations are referred to as addition in this application.

TABLE 2

| Instruction Name | Byte 3 | Byte 2 | Byte 1 | Byte 0 |
| --- | --- | --- | --- | --- |
| 32 bit add | PSCO | PSCO | PSCO | 0 |
| 2 × 16 bit add | PSCO | 0 | PSCO | 0 |
| 4 × 8 bit add | 0 | 0 | 0 | 0 |
| 8/8/16 bit add | 0 | 0 | PSCO | 0 |
| 8/16/8 bit add | 0 | PSCO | 0 | 0 |
| 16/8/8 bit add | PSCO | 0 | 0 | 0 |
| 8/24 bit add | 0 | PSCO | PSCO | 0 |
| 24/8 bit add | PSCO | PSCO | 0 | 0 |
| 32 bit add - extended precision | PSCO | PSCO | PSCO | PSCO |
| 4 × 8 bit add - extended precision | SSPCO | SSPCO | SSPCO | SSPCO |

The initial entries in Table 2 (32 bit add, 2×16 bit add and 4–8 bit add) are known in the art. These functions correspond to split adder unit single instruction multiple data (SIMD) operations. The other operations are not known. In particular, it has not heretofore been known to employ such versatile carry control to enable mixed data widths in a single adder unit SIMD operation. The last operations listed are noted as extended precision. The 32 bit add extended precision is useful for performing 64 bit addition using two passes through adder unit 100. The first pass with the 32 least significant bits stores the 32 bit carry output in carry output register 115. Selection of prior section carry output (PSCO) for byte 0 supplies this as the carry input for the addition of the most significant bits. Additional use of this same set of carry control signals would permit extended precision additions of even greater length. Similarly, the 4×8 bit add extended precision could be used as the second or subsequent operation in a set of packed 8 bit additions. The carry output of adder unit sections 111, 121, 131 and 141 are stored in respective carry output registers 115, 125, 135 and 145. This value is used as the carry input to each section for another packed 8 bit addition. Thus, for example, multiple additions on packed 8 bit data that might overflow can be handled using this carry control coding.

Figure 3:
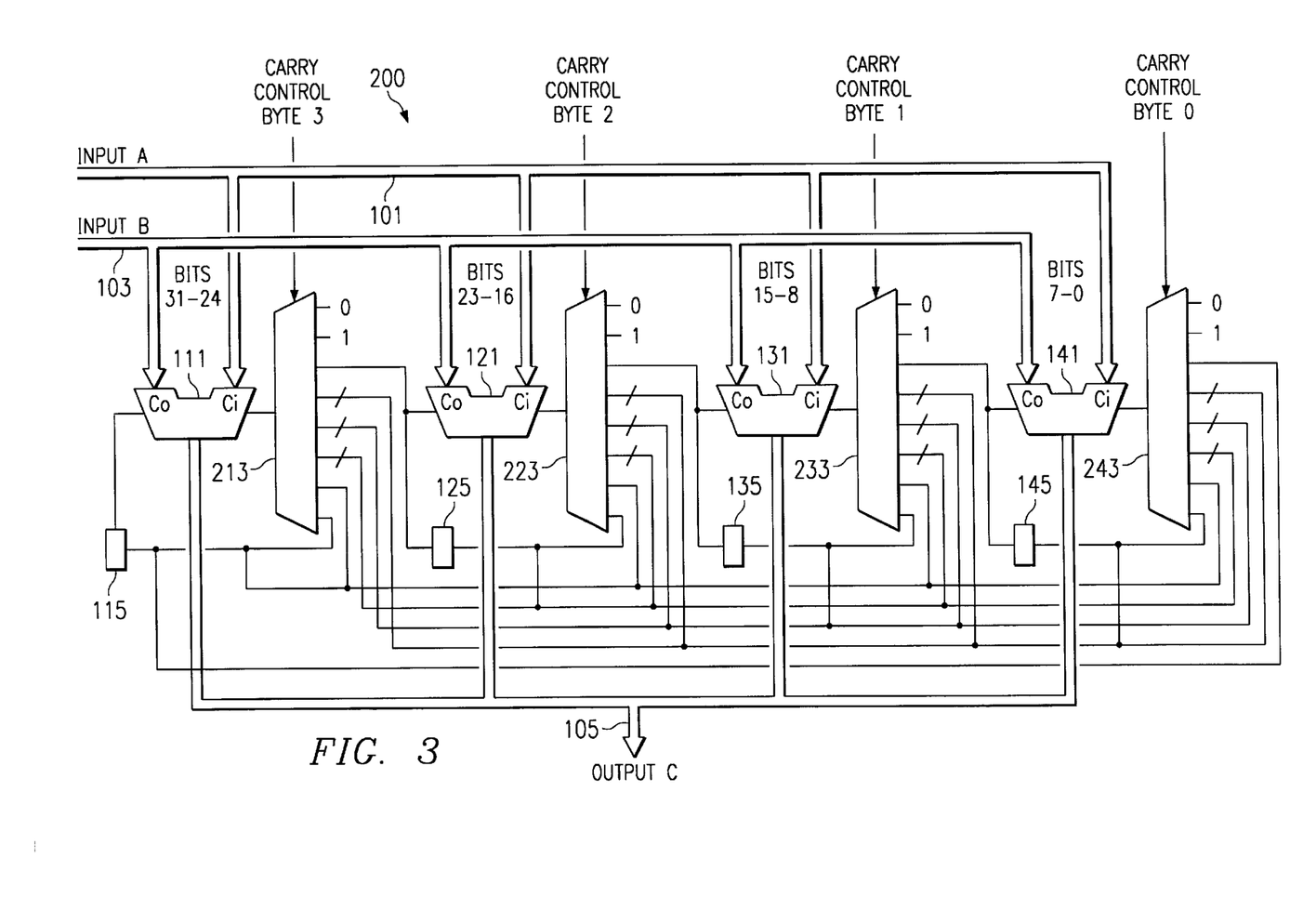
FIG. 3 illustrates in schematic diagram form another embodiment of the arithmetic logic unit carry control of this invention.

FIG. 3 illustrates in schematic diagram form an alternative embodiment with more versatile carry control. Adder unit 200 illustrated in FIG. 3 includes many of the same parts as adder unit 100 of FIG. 1. These parts are given the same reference numbers. FIG. 3 illustrates carry control signals for bytes 3, 2, 1 and 0. These carry control signals could be sourced in any manner previously described. Carry multiplexers 213, 223, 233 and 234 are more complex than carry multiplexers 113, 123, 133, and 143 illustrated in FIG. 1. Each carry multiplexer 213, 223, 233 and 243 selects from among 8 inputs. Thus the corresponding carry control signals each require 3 bits. Table 3 shows an exemplary coding of these carry control fields.

TABLE 3

| Carry Control Field Coding | Carry Input Selection |
| --- | --- |
| 0 0 0 | 0 |
| 0 0 1 | 1 |
| 0 1 0 | Prior Section Carry Out (PSCO) |
| 0 1 1 | Same Section Prior Carry Out (SSPCO) |
| 1 0 0 | Byte 0 Stored Carry Output |
| 1 0 1 | Byte 1 Stored Carry Output |
| 1 1 0 | Byte 2 Stored Carry Output |
| 1 1 1 | Byte 3 Stored Carry Output |

The first four entries in Table 3 are the same as those of Table 1. These encode: 0; 1; the prior section carry output; and the stored prior carry output of the same section. As previously described the prior section carry output (PSCO) control applied to byte 0 would select the carry output of the prior adder unit operation stored in carry output register 115. Each of the other entries in Table 3 encode selecting the stored carry output from one of the adder unit sections. The connections are illustrated in FIG. 3, in which the stored carry output from carry output registers 115, 125, 135 and 145 are supplied to each carry multiplexer 213, 223, 233 and 243. Note that for each carry control signal there are two ways to code the same section prior carry output. This is either coding "011" or one of the codings "100", "101", "110" or "111" depending upon the particular section. This redundancy is tolerated to make the last four entries the same for each section for ease of remembering. The final four entries in Table 3 permit extended precision addition on packed data of any size including mixed sizes. This is because the stored prior carry output from any section may be supplied to the carry input of any section.

Figure 4:
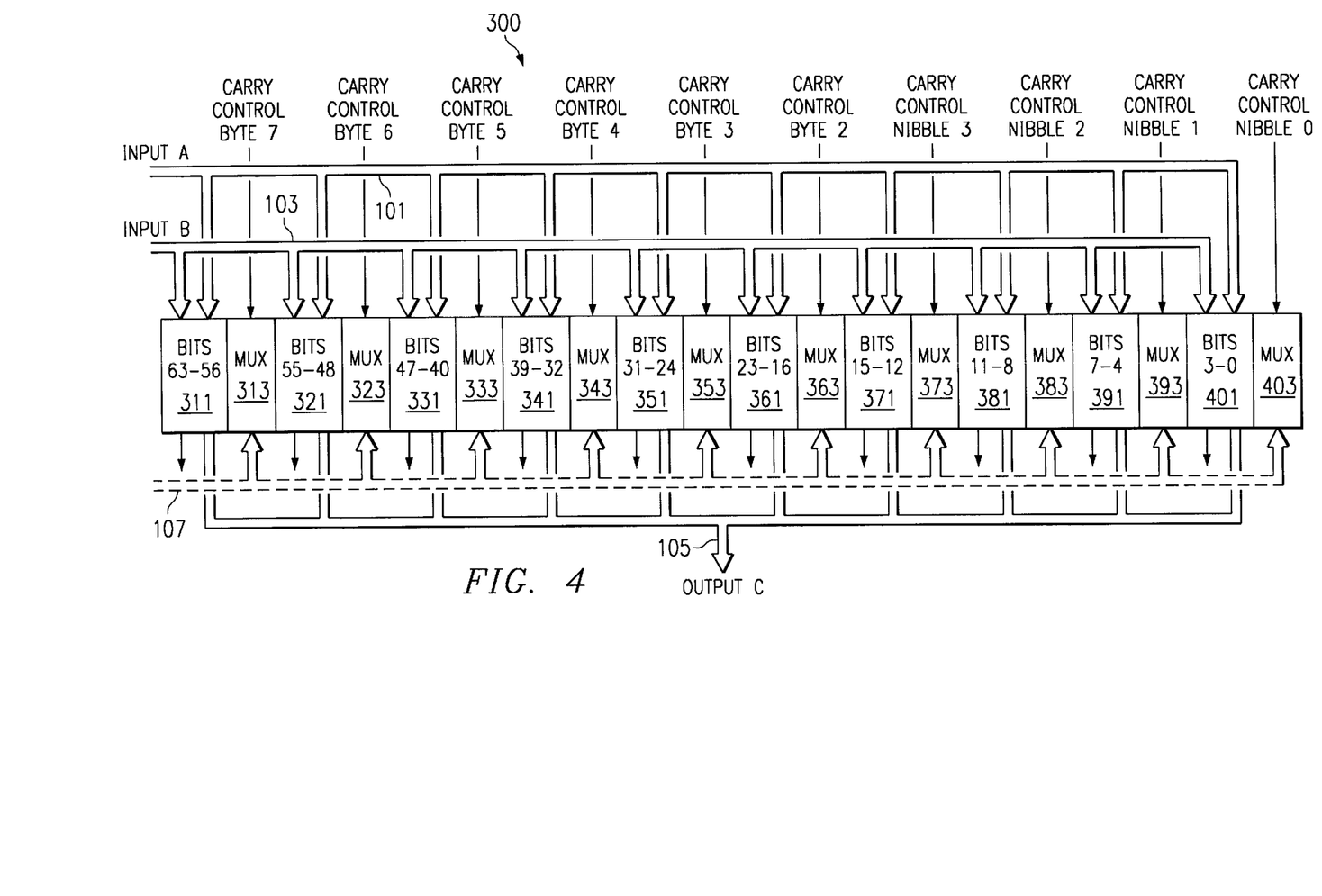
FIG. 4 illustrates in block diagram form a further embodiment of the division of sections of the arithmetic logic unit of this invention.

FIG. 4 illustrates in block diagram form the structure of another embodiment of the adder unit. Like parts as illustrated in FIGS. 1 and 3 are given like reference numbers. Adder unit 400 illustrated in FIG. 4 consists of 64 bits divided into 10 sections. These ten sections are of unequal size. Adder unit sections 311, 321, 331, 341, 351 and 361 are of 8 bits or one byte each. Adder unit sections 371, 381, 391 and 401 are of 4 bits or one nibble each. The stored carry outputs of each of the adder unit sections 311, 321, 331, 341, 351, 361, 371, 381, 391 and 401 are supplied to a carry output bus 107. The carry output bus 107 supplies each of multiplexers 313, 323, 333, 343, 353, 363, 373, 383, 393 and 403 with the carry outputs from each of the adder unit sections 311, 321, 331, 341, 351, 361, 371, 381, 391 and 401. These multiplexers 313, 323, 333, 343, 353, 363, 373, 383, 393 and 403 select one of the signals on the carry output bus 107 for supply to their corresponding adder unit sections 311, 321, 331, 341, 351, 361, 371, 381, 391 and 401 in response to their respective carry control signals. Since each of the multiplexers 313, 323, 333, 343, 353, 363, 373, 383, 393 and 403 selects from among 12 inputs, their carry control signals must include 4 bits. An example of the coding of these carry control signals is shown below in Table 4.

TABLE 4

| Carry Control Field Coding | Carry Input Selection |
| --- | --- |
| 0 0 0 0 | 0 |
| 0 0 0 1 | 1 |
| 0 0 1 0 | Prior Section Carry Out (PSCO) |
| 0 0 1 1 | Same Section Prior Carry Out (SSPCO) |
| 0 1 0 0 | Nibble 0 Stored Carry Output |
| 0 1 0 1 | Nibble 1 Stored Carry Output |
| 0 1 1 0 | Nibble 2 Stored Carry Output |
| 0 1 1 1 | Nibble 3 Stored Carry Output |
| 1 0 0 0 | Byte 0 (Nibble 1) Stored Carry Output |
| 1 0 0 1 | Byte 1 (Nibble 3) Stored Carry Output |
| 1 0 1 0 | Byte 2 Stored Carry Output |
| 1 0 1 1 | Byte 3 Stored Carry Output |
| 1 1 0 0 | Byte 4 Stored Carry Output |
| 1 1 0 1 | Byte 5 Stored Carry Output |
| 1 1 1 0 | Byte 6 Stored Carry Output |
| 1 1 1 1 | Byte 7 Stored Carry Output |

Note that the carry output of nibble 1 corresponds to the carry output of bit 7 and is the same as the carry output of byte 0. Similarly, the carry output of nibble 3 corresponds to the carry output of bit 16 and is the same as the carry output of byte 1. As in the case of the three bit coding illustrated in Table 3, this 4 bit coding includes some redundancy. As noted in the table, selection of the carry output of bit 7, being both nibble 1 and byte 0, is encoded by both "0101" and "1000." Also, selection of the carry output of bit 15, being both nibble 3 and byte 1, is encoded by both "0111" and "1001." Additionally, the stored carry output of the current section may be selected by two encodings in all cases. If the section is nibble 1 or nibble 3, then its stored carry output may be selected by three encodings.

FIG. 4 illustrates the nibble size sections 371, 381, 391 and 401 occupying the least significant bits of adder unit 300. This is merely a design choice. Adder unit could equally well have been constructed with the nibble size sections occupying the most significant bits. Other mixed size configurations are also feasible. The selection of the size and position of the various adder unit sections should be based upon the expected distribution of packed data sizes to be processed.

The supply of all section carry outputs to each carry: multiplexer enables a unique function. It is possible to propagate a carry output from one section to any of the other sections. Thus the packed data words need not have the plural data parts disposed in contiguous bits. For example, in a 32 bit adder a 16 bit quantity. may have its least significant bits disposed in byte 0 and its most significant bits in byte 2 or byte 3. The least significant and most significant parts may be reversed where the most significant bits are disposed in byte 0 and the least significant bit disposed in byte 1. Thus this invention permits much greater flexibility in packed data SIMD operations than previously obtainable.

As a further alternative, it is not necessary to supply all carry output to all carry multiplexers for this invention to be useful. For example, in 64 bit adder 300 it may be sufficient to supply nibbles 0, 1, 2 and 3 with only the nibble carry outputs, while supplying only the nibble 1 and nibble 3 outputs to bytes 2 and 3. Additionally, bytes 4, 5, 6 and 7 may need to select from 0, 1, the prior byte carry output and the same byte stored prior carry output. In such an event, complex carry control would be enabled for the least. significant bits while simpler control would be enabled for the most significant bits. This would reduce the number of carry control bits necessary for the less connected bytes, thereby reducing the total number of bits that must be specified for any particular operation. Any such mixed coding would involve trading carry operation flexibility for reduced coding and storage requirements.

Figure 5:
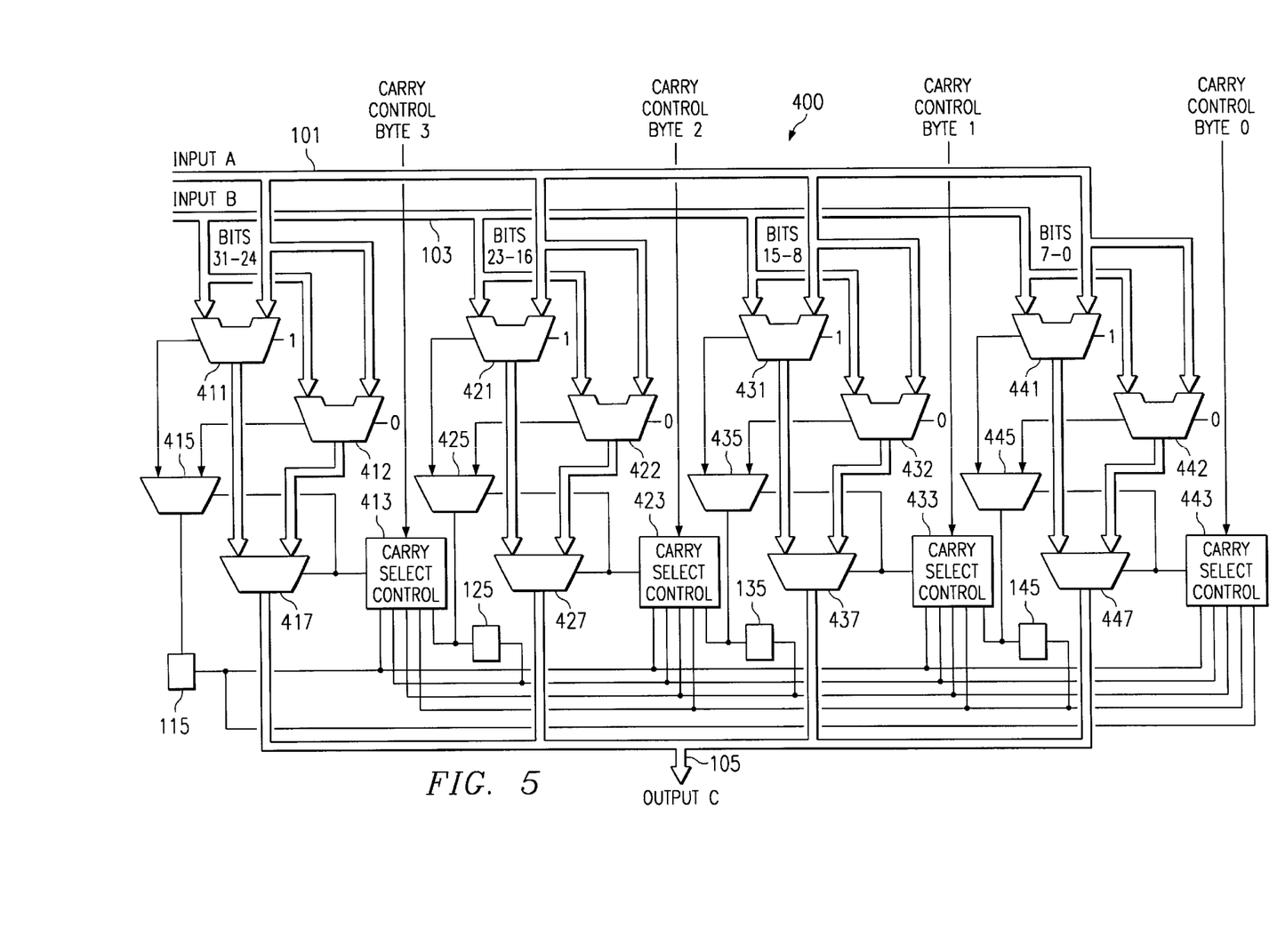
FIG. 5 illustrates in schematic diagram form the construction of an example of this invention applied to a carry select arithmetic logic unit.

FIG. 5 illustrates in schematic diagram form the construction of an example of this invention applied to a carry select adder unit. The prior description of versatile carry control for adder units assumed that a carry could ripple through the entire length. This construction is known as a carry propagate adder. Certain high speed adder units employ a technique known as carry select. In a carry select adder unit, the bits are divided into plural sections as illustrated in FIGS. 1, 3 and 4. Each adder unit section includes two parallel set of bits. One set of bits receives the A and B inputs, a "1" carry input and produces a first C output. The other set of bits receives the A and B inputs, a "0" carry input and produces a second C output. Following an interval sufficient for the carry to ripple through each section, the carry output of each section is employed to select either the first or second C output of the next most significant section. This technique speeds execution of the adder unit operation by enabling a shorter carry ripple within each section in parallel with other sections rather than requiring a serial carry ripple through the entire adder unit.

As illustrated in FIG. 5, adder unit sections 411, 421, 431 and 441 receive parts of the input bits on input busses 101 and 103. Each of these adder unit sections receives a "1" carry input. Adder unit sections 412, 422, 432 and 442 receive parts of the input bits on input busses 101 and 103 and "0" carry input. Carry select control circuits 413, 423, 433 and 433 receive the carry output from the prior section as well as the stored carry output from each of the sections. Each carry select control circuit 413, 423, 433 and 443 receive a corresponding carry control signal. These carry control signals could be sourced in any manner previously described. Carry control select circuits 413, 423, 433 and 443 control respective multiplexers 417, 427, 437 and 447 to select the appropriate C output for the corresponding section depending on the prior section carry output and the carry control selection signal. Carry control select circuits 413, 423, 433 and 443 likewise control respective multiplexers 415, 425, 435 and 445 to select the appropriate carry output for the corresponding section.

The carry control signals used with adder unit 400 illustrated in FIG. 5 may be of the same coding as shown in Table 3. For example, if the carry control signal for byte 3 is "000", which indicates a fixed carry input of "0", then carry select circuit 413 causes multiplexers 415 and 415 to select respective outputs from adder unit section 412. For an byte 3 carry control selection signal of "001", then carry select circuit 413 causes multiplexers 415 and 415 to select respective outputs from adder unit section 411. For other carry select signals, carry control circuit 413 causes multiplexers 415 and 417 to select outputs from the adder unit section 411 or 412 having the fixed carry input equal to the carry output of the section indicated by the carry control signal. In other aspects adder unit 400 operates like adder unit 200 illustrated in FIG. 3.

What is claimed is:

1. A data processing circuit comprising:

a first input bus transmitting a first multibit input operand;

a second input bus transmitting a second multibit input operand;

an adder unit connected to said first and second input busses, said adder unit divided input a plurality of sections, each section receiving a subset of bits of said first multibit input operand from said first input bus, a corresponding subset of bits of said second multibit input operand from said second input bus and a carry input, each section producing a corresponding subset of bits of a resultant output and a carry output;

an output bus connected to said adder unit transmitting a multibit resultant output said subsets of bits of resultant output of said plurality of sections of said adder unit;

a source of a plurality of carry control signals equal in number to a number of said plurality of sections of said adder unit;

a plurality of carry input select control circuits, each carry input select control circuits receiving a corresponding one of said plurality of carry control signals and controlling a carry input of a corresponding section of said adder unit from among a plurality of carry inputs including at least said carry output of a prior section as designated by said corresponding carry control signal; and wherein said data processing circuit is responsive to opcodes of received instructions for sourcing said plurality of carry control signals.

2. The data processing circuit of claim 1, wherein:

said adder unit consists of a carry, propagate adder unit; and each of said carry select control circuits consists of a input multiplexer, each carry input multiplexer receiving a corresponding one of said plurality of carry control signals and supplying a carry input to a corresponding one of said plurality of sections of said adder unit, each carry input multiplexer selecting a carry input for supply to said corresponding section of said adder unit from a plurality of inputs including at least said carry output of a prior section as designated by said corresponding carry control signal.

3. The data processing circuit of claim 1, wherein:

said adder unit consists of a carry select adder unit in which each section includes
a 0 carry input section,
a 1 carry input section,
a resultant multiplexer connected to a resultant output of said carry 0 input section and said carry 1 input section selecting one of said resultant outputs, a carry multiplexer connected to a carry output of said carry 0 input section and said carry 1 input section selecting one of said carry outputs, each of said carry select control circuits receives a corresponding one of said plurality of carry control signals and said carry output of said prior section, each of said carry select control circuits controlling said resultant multiplexer and said carry multiplexer of said corresponding section to select either said resultant output and said carry output of said carry 0 input section or said resultant output and said carry output of said carry 1 input section depending upon said prior section carry output and said carry control signal.

4. A data processing circuit comprising:

a first input bus transmitting a first multibit input operand;

a second input bus transmitting a second multibit input operand;

an adder unit connected to said first and second input busses, said adder unit divided input a plurality of sections, each section receiving a subset of bits of said first multibit input operand from said first input bus, a corresponding subset of bits of said second multibit input operand from said second input bus and a carry input, each section producing a corresponding subset of bits of a resultant output and a carry output;

an output bus connected to said adder unit transmitting a multibit resultant output said subsets of bits of resultant output of said plurality of sections of said adder unit;

a source of a plurality of carry control signals equal in number to a number of said plurality of sections of said adder unit;

a plurality of carry input select control circuits, each carry input select control circuit receiving a corresponding one of said plurality of carry control signals and controlling a carry input of a corresponding section of said adder unit from among a plurality of carry inputs including at least said carry output of a prior section as designated by said corresponding carry control signal; and wherein said data processing circuit is responsive to a combination of opcodes and opcode modifiers of received instructions for sourcing said plurality of carry control signals.

5. A data processing circuit comprising:

a first input bus transmitting a first multibit input operand;

a second input bus transmitting a second multibit input operand;

an adder unit connected to said first and second input busses, said adder unit divided input a plurality of sections, each section receiving a subset of bits of said first multibit input operand from said first input bus, a corresponding subset of bits of said second multibit input operand from said second input bus and a carry input, each section producing a corresponding subset of bits of a resultant output and a carry output;

an output bus connected to said adder unit transmitting a multibit resultant output said subsets of bits of resultant output of said plurality of sections of said adder unit;

a source of a plurality of carry control signals equal in number to a number of said plurality of sections of said adder unit;

a plurality of carry input select control circuits, each carry input select control circuit receiving a corresponding one of said plurality of carry control signals and controlling a carry input of a corresponding section of said adder unit from among a plurality of carry inputs including at least said carry output of a prior section as designated by said corresponding carry control signal; and wherein said data processing circuit is responsive to an immediate field of received instructions for sourcing said plurality of carry control signals.

6. The data processing circuit of claim 5, wherein:

said immediate field of at least one received instruction consists of a carry control signal field for each of said plurality of multiplexers.

7. A data processing circuit comprising:

a first input bus transmitting a first multibit input operand;

a second input bus transmitting a second multibit input operand;

an adder unit connected to said first and second input busses, said adder unit divided input a plurality of sections, each section receiving a subset of bits of said first multibit input operand from said first input bus, a corresponding subset of bits of said second multibit input operand from said second input bus and a carry input, each section producing a corresponding subset of bits of a resultant output and a carry output;

an output bus connected to said adder unit transmitting a multibit resultant output said subsets of bits of resultant output of said plurality of sections of said adder unit;

a source of a plurality of carry control signals equal in number to a number of said plurality of sections of said adder unit;

a plurality of carry input select control circuits, each carry input select control circuit receiving a corresponding one of said plurality of carry control signals and controlling a carry input of a corresponding section of said adder unit from among a plurality of carry inputs including at least said carry output of a prior section as designated by said corresponding carry control signal;

a plurality of carry control registers, each carry control register storing a carry control signal field for each of said plurality of carry input select control circuits; and wherein said data processing circuit being responsive to a carry control register field of received instructions for selecting one of said plurality of carry control registers to supply said carry control signal fields to said carry input select control circuits.

8. The data processing circuit of claim 7, further comprising:

an instruction decoder unit receiving instructions for control of said data processing circuit, said instruction decoder unit responsive to at least one carry control register write instruction to transfer instruction specified data to an instruction specified one of said carry control registers.

9. A data processing circuit comprising:

a first input bus transmitting a first multibit input operand;

a second input bus transmitting a second multibit input operand;

an adder unit connected to said first and second input busses, said adder unit divided input a plurality of sections, each section receiving a subset of bits of said first multibit input operand from said first input bus, a corresponding subset of bits of said second multibit input operand from said second input bus and a carry input, each section producing a corresponding subset of bits of a resultant output and a carry output;

an output bus connected to said adder unit transmitting a multibit resultant output said subsets of bits of resultant output of said plurality of sections of said adder unit;

a source of a plurality of carry control signals equal in number to a number of said plurality of sections of said adder unit;

a plurality of carry output registers equal in number to a number of sections of said adder unit, each carry output register storing said carry output of a corresponding section of said adder unit;

a plurality of carry input select control circuits, each carry input select control circuit receiving a corresponding one of said plurality of carry control signals and controlling a carry input of a corresponding section of said adder unit from among a plurality of carry inputs including at least said carry output of a prior section as designated by said corresponding carry control signal, each of said carry input select control circuit receiving a fixed carry input of "0", a fixed carry input of "1", said carry output of said prior section of said adder unit and said carry output of said corresponding section stored in said corresponding carry output register.

10. The data processing circuit of claim 9, wherein:

each of said carry control signals consists of two bits; and each of said carry input select control circuits selecting for output said fixed carry input of "0" if said two bit carry control signal is a first two bit code, said fixed carry input of "1" if said two bit carry control signal is a second two bit code, said carry output of said prior section of said adder unit if said two bit carry control signal is a third two bit code, and said carry output of said corresponding section stored in said corresponding carry output register if said two bit carry control signal is a fourth two bit code.

11. The data processing circuit of claim 9, wherein:

said carry input select control circuit of a least significant bit section of said adder unit selects said carry output stored in said carry output register corresponding to a most significant bit section of said adder unit whenever said corresponding carry control signals indicate selection of said carry output of said prior section of said adder unit.

12. A data processing circuit comprising:

a first input bus transmitting a first-multibit input operand;

a second input bus transmitting a second multibit input operand;

an adder unit connected to said first and second input busses, said adder unit divided input a plurality of sections, each section receiving a subset of bits of said first multibit input operand from said first input bus, a corresponding subset of bits of said second multibit input operand from said second input bus and a carry input, each section producing a corresponding subset of bits of a resultant output and a carry output;

an output bus connected to said adder unit transmitting a multibit resultant output said subsets of bits of resultant output of said plurality of sections of said adder unit;

a source of a plurality of carry control signals equal in number to a number of said plurality of sections of said adder unit;

a plurality of carry output registers equal in number to a number of sections of said adder unit, each carry output register storing said carry output of a corresponding section of said adder unit;

a plurality of carry input select control circuits, each carry input select control circuit receiving a corresponding one of said plurality of carry control signals and controlling a carry input of a corresponding section of said adder unit from among a plurality of carry inputs including at least said carry output of a prior section as designated by said corresponding carry control signal, each of said carry input select control circuit receiving said carry output of said prior section of said adder unit and said carry output of every section of said adder unit stored-in said corresponding carry output register.

13. The data processing circuit of claim 12, wherein:

said adder is divided into first, second, third and fourth sections;

each of said carry control signals consists of three bits; and each of said carry input select control circuits selecting for output
- said fixed carry input of "0" if said three bit carry control signal is a first three bit code,
- said fixed carry input of "1" if said three bit carry control signal is a second three bit code,
- said carry output of said prior section of said adder unit if said three bit carry control signal is a third three bit code,
- said carry output of said corresponding section stored in said corresponding carry output register if said three bit carry control signal is a fourth three bit code,
- said carry output of said first section stored in said corresponding carry output register if said three bit carry control signal is a fifth three bit code,
- said carry output of said second section stored in said corresponding carry output register if said three bit carry control signal is a sixth three bit code,
- said carry output of said third section stored in said corresponding carry output register if said three bit carry control signal is a seventh three bit code, and
- said carry output of said fourth section stored in said corresponding carry output register if said three bit carry control signal is an eighth three bit code.

14. The data processing circuit of claim 12, wherein:

said carry input select control circuit of a least significant bit section of said adder unit selects said carry output stored in said carry output register corresponding to a most significant bit section of said adder unit whenever said corresponding carry control signals indicate selection of said carry output of said prior section of said adder unit.

15. A data processing circuit comprising:

a first input bus transmitting a first multibit input operand;

a second input bus transmitting a second multibit input operand;

an adder unit connected to said first and second input busses, said adder unit divided input a plurality of sections, each section receiving a subset of bits of said first multibit input operand from said first input bus, a corresponding subset of bits of said second multibit input operand from said second input bus and a carry input, each section producing a corresponding subset of bits of a resultant output and a carry output, said adder unit being divided into sections of unequal length;

an output bus connected to said adder unit transmitting a multibit resultant output said subsets of bits of resultant output of said plurality of sections of said adder unit;

a source of a plurality of carry control signals equal in number to a number of said plurality of sections of said adder unit;

a plurality of carry input select control circuits, each carry input select control circuit receiving a corresponding one of said plurality of carry control signals and controlling a carry input of a corresponding section of said adder unit from among a plurality of carry inputs including at least said carry output of a prior section as designated by said corresponding carry control signal.

16. The data processing circuit of claim 15, wherein:

said adder unit is divided into sections of two lengths, sections of a smaller of said two lengths occupying least significant bits of said adder unit.

17. The data processing circuit of claim 15, wherein:

said adder unit is divided into sections of two lengths, sections of a smaller of said two lengths occupying most significant bits of said adder unit.

18. The data processing circuit of claim 15, wherein:

said adder is divided into ten sections, said ten sections consist of first, second, third and fourth sections having a first length and fifth, sixth, seventh, eighth, ninth and tenth sections having a second length twice said first length;

each of said carry control signals consists of four bits; and each of said carry input select control circuits selecting for output
- said fixed carry input of "0" if said four bit carry control signal is a first four bit code,
- said fixed carry input of "1" if said four bit carry control signal is a second four bit code,
- said carry output of said prior section of said adder unit if said four bit carry control signal is a third four bit code,
- said carry output of said corresponding section stored in said corresponding carry output register if said four bit carry control signal is a fourth four bit code,
- said carry output of said first section stored in said corresponding carry output register if said four bit carry control signal is a fifth four bit code,
- said carry output of said second section stored in said corresponding carry output register if said four bit carry control signal is a sixth four bit code,
- said carry output of said third section stored in said corresponding carry output register if said four bit carry control signal is a seventh four bit code,
- said carry output of said fourth section stored in said corresponding carry output register if said four bit carry control signal is an eighth four bit code,
- said carry output of said second section stored in said corresponding carry output register if said four bit carry control signal is a ninth four bit code,
- said carry output of said fourth section stored in said corresponding carry output register if said four bit carry control signal is a tenth four bit code,
- said carry output of said fifth section stored in said corresponding carry output register if said four bit carry control signal is an eleventh four bit code,
- said carry output of said sixth section stored in said corresponding carry output register if said four bit carry control signal is a twelfth four bit code,
- said carry output of said seventh section stored in said corresponding carry. output register if said four bit carry control signal is a thirteenth four bit code,
- said carry output of said eighth section stored in said corresponding carry output register if said four bit carry control signal is a fourteenth four bit code,
- said carry output of said ninth section stored in said corresponding carry output register if said four bit carry control signal is a fifteenth four bit code, and
- said carry output of said tenth section stored in said corresponding carry output register if said four bit carry control signal is a sixteenth four bit code.

19. The data processing circuit of claim 18, wherein:

said adder consists of 64 bits;

said first length is 4 bits, and said second length is 8 bits.

20. The data processing circuit of claim 15, wherein:

said adder is divided into ten sections, said ten sections consist of first, second, third and fourth sections having a first length and fifth, sixth, seventh, eighth, ninth and tenth sections having a second length twice said first length;

each of said carry input select control circuits corresponding to said first, second, third and fourth sections receiving said carry output of said prior section of said adder unit and said carry output of said first, second, third and fourth sections of said adder unit stored in said corresponding carry output register;

each of said carry input select control circuits corresponding to said fifth and sixth sections receiving said carry output of said prior section of said adder unit and said carry output of said second and fourth sections of said adder unit stored in said corresponding carry output register; and each of said carry input select control circuits corresponding to said seventh, eighth, ninth and tenth sections receiving a fixed carry input of "0", a fixed carry input of "1", said carry output of said prior section of said adder unit and said carry output of said corresponding section stored in said corresponding carry output register.

21. The data processing circuit of claim 20, wherein:

said adder consists of 64 bits;

said first length is 4 bits, and said second length is 8 bits.

* * * * *